United States Patent Office 2,673,658
Patented Sept. 18, 1956

2,763,658

PYRIDINE DICARBOXYLIC ACIDS

Francis E. Cislak, Indianapolis, Ind., assignor to Reilly Tar & Chemical Corporation, Indianapolis, Ind., a corporation of Indiana No Drawing. Application April 5, 1956,
Serial No. 576,246

10 Claims. (Cl. 260—295)

This invention relates to pyridine dicarboxylic acids and to the process of making them. More particularly, it relates to pyridine dicarboxylic acids having the following general formula:

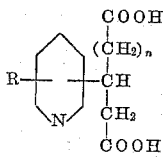

where $n$ is 0 or 1 and R is hydrogen or lower alkyl.

In general, the compounds of my invention may be prepared by the oxidation of a pyridine glycol. The pyridine glycols used in my present invention are new compounds. The process of preparing them is described in a co-pending application Serial No. 565,545, filed February 15, 1956.

My invention will be described more fully in conjunction with the following specific examples. It should be understood, however, that these examples are given by way of illustration only, and my invention is not to be limited by the details set forth therein.

EXAMPLE 1

*4-(3-pentan-1:5-dicarboxy)pyridine*

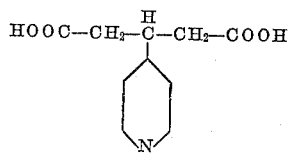

In a 5-liter round-bottom flask, equipped with mechanical stirrer, is placed about 5 kilograms of concentrated nitric acid (specific gravity 1.42). While stirring the acid, there is gradually added 220 grams of 4-(3-pentan-1:5-diol)pyridine. After all of the latter compound has been added, the flask is placed on a steam bath and gradually warmed until nitrogen dioxide fumes are evolved. The rate of heating should be diminished once the oxidation starts; the heat of the reaction is usually sufficient to keep the reaction going. As the evolution of the oxides of nitrogen diminishes, more heat may be applied. The reaction is considered complete when the brown fumes are no longer evolved. The 4-(3-pentan-1:5-dicarboxy)-pyridine formed during the reaction mixture may be isolated in any convenient manner.

One convenient manner of isolating the 4-(3-pentan-1:5-dicarboxy)pyridine is as follows: The reaction mixture is subjected to vacuum distillation. When most of the liquid is distilled off, the distillation is interrupted and to the contents of the flask there is added 1000 cc. of isopropyl alcohol. After thorough mixing, the pH of the solution is adjusted to about 3 by the addition of ammonium hydroxide. The contents of the flask are again subjected to vacuum distillation to remove most of the remaining water. The residue in the flask is treated with decolorizing carbon and filtered. The filtrate is evaporated to dryness under vacuum on a steam bath. For most purposes, the 4-(3-pentan-1:5-dicarboxy)pyridine is pure enough as thus obtained.

While I prefer to use nitric acid to oxidize the pyridine glycols to the corresponding dicarboxy acids, I can use other oxidizing agents. A convenient laboratory procedure utilizing potassium permanganate as the oxidizing agent is given in Example 2.

EXAMPLE 2

*2-(3-pentan-1:5-dicarboxy)pyridine*

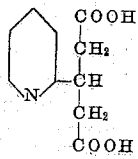

A 12-liter three-necked flask equipped with a stirrer and thermometer is placed in a water bath. To the flask are added 540 grams of 2-(3-pentan-1:5-diol)pyridine, 5 liters of water, and 400 grams of sulfuric acid. While stirring the solution, there is added over a period of several hours 1264 grams of powdered potassium permanganate. The temperature of the reaction mixture is maintained at about 50° C. After all of the permanganate has been added, the temperature of the mixture is maintained at about 50° C. until the purple color of the permanganate disappears. The temperature of the reaction mixture is then elevated to about 80° and maintained at that temperature for about one hour. Then the hot reaction mixture is filtered. The filtrate is evaporated to dryness under vacuum on a steam bath and the residue thus obtained is extracted with hot isopropyl alcohol, treated with decolorizing carbon, filtered and the filtrate cooled to obtain 2-(3-pentan-1:5-dicarboxy)pyridine.

EXAMPLE 3

*3-(3-pentan-1:5-dicarboxy)pyridine*

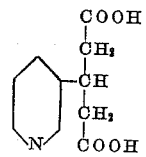

The procedure of Example 2 is followed except that in place of the 2-(3-pentan-1:5-diol)pyridine, I use 3-(3-pentan-1:5-diol)pyridine.

EXAMPLE 4

*2-(2-butan-1:4-dicarboxy)pyridine*

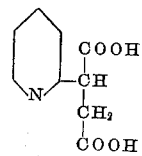

The procedure of Example 2 is followed except that in place of the 2-(3-pentan-1:5-diol)pyridine I use 2-(2-butan-1:4-diol)pyridine.

EXAMPLE 5

*2-(3-pentan-1:5-dicarboxy)-5-ethylpyridine*

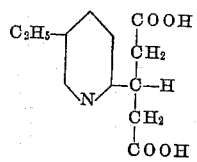

The procedure of Example 1 is followed except that in place of the 4-(3-pentan-1:5-diol)pyridine, I use 2-(3-pentan-1:5-diol)-5-ethylpyridine.

The pyridine dicarboxylic acids of my invention are difunctional acids. They have the chemical properties associated with carboxylic acids and are capable of entering into the same type of reactions as other dicarboxylic acids, within the limitations imposed by the pyridine nucleus. They possess a very low volatility.

Of the many reactions possible with my pyridine dicarboxylic acids, that of most commercial significance is esterification. The pyridine dicarboxylic acids are good raw materials from which to make resins. They are particularly useful in preparation of polyester resins. The term "polyester" is applied to a wide variety of resins formed by reaction of polybasic acids such as phthalic, maleic, and the like with polyhydric alcohols such as glycerol, ethylene glycol, etc. The polyester resins are used in paints; as potting compounds for the impregnation and embedment of electrical components; reinforced with glass fibers they are used in structural materials.

By the use of a small percentage (3% to 25%) of my pyridine dicarboxylic acids in the molecular makeup of the polyesters, the ability of these resins to wet surfaces is greatly enhanced.

The dyeing properties of polyester type synthetic fibers are improved by the incorporation of my pyridine dicarboxylic acids in their molecular makeup.

I claim as my invention:

1. Pyridine dicarboxylic acids having the following general formula:

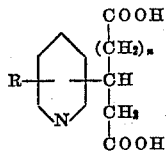

where $n$ represents an integer selected from 0 and 1 and R is selected from the class consisting of hydrogen and lower alkyl.

2. The compound 4-(3-pentan-1:5-dicarboxy)pyridine.
3. The compound 2-(3-pentan-1:5-dicarboxy)pyridine.
4. The compound 3-(3-pentan-1:5-dicarboxy)pyridine.
5. The compound 2-(2-butan-1:4-dicarboxy)pyridine.
6. The compound 2-(3-pentan-1:5-dicarboxy)-5-ethylpyridine.
7. The process of preparing pyridine dicarboxylic acids having the following general formula:

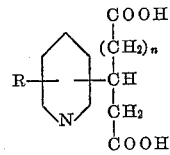

where $n$ is an integer selected from 0 and 1 and R is selected from the class consisting of hydrogen and lower alkyl, which comprises heating the corresponding pyridine glycol with an oxidizing agent of the class consisting of nitric acid and potassium permanganate and recovering the pyridine dicarboxylic acid.

8. The process of preparing 4-(3-pentan-1:5-dicarboxy)pyridine which comprises dissolving 4-(3-pentan-1:5-diol)pyridine in dilute sulfuric acid, oxidizing said solution with potassium permanganate and recovering the resultant 4-(3-pentan-1:5-dicarboxy)pyridine.

9. The process of preparing 4-(3-pentan-1:5-dicarboxy)pyridine which comprises heating a solution of nitric acid and 4-(3-pentan-1:5-diol)pyridine and recovering the resultant 4-(3-pentan-1:5-dicarboxy)pyridine.

10. The process of preparing 2-(3-pentan-1:5-dicarboxy)-5-ethylpyridine which comprises heating a solution of nitric acid and 2-(3-pentan-1:5-diol)-5-ethylpyridine and recovering the resultant 2-(3-pentan-1:5-dicarboxy)-5-ethylpyridine.

References Cited in the file of this patent

Walter et al.: J. Am. Chem. Soc., vol. 57, pp. 1891–2 (1935).

Winterfeld et al.: Chem. Abst., vol. 46, col. 5059 (1952).